United States Patent
Linner

(10) Patent No.: US 6,668,543 B2
(45) Date of Patent: Dec. 30, 2003

(54) ROCKET PROPULSION UNIT WITH SEPARATION OF INNER AND OUTER CASING AND METHOD OF MAKING SAME

(75) Inventor: Herbert Linner, Garching (DE)

(73) Assignee: Astrium GmbH, Munich (DE)

( * ) Notice: Subject to any disclaimer, the term of this patent is extended or adjusted under 35 U.S.C. 154(b) by 8 days.

(21) Appl. No.: 10/157,814

(22) Filed: May 31, 2002

(65) Prior Publication Data

US 2002/0178712 A1 Dec. 5, 2002

(30) Foreign Application Priority Data

Jun. 1, 2001 (DE) .......................................... 101 26 923

(51) Int. Cl.$^7$ ................................................. F02K 9/44
(52) U.S. Cl. ........................................... 60/267; 60/257
(58) Field of Search ........................ 60/266, 267, 253, 60/257; 29/890.01

(56) References Cited

U.S. PATENT DOCUMENTS

| 2,555,081 | A | * | 5/1951 | Goddard ....................... 60/201 |
| 2,933,888 | A | * | 4/1960 | Africano ...................... 60/265 |
| 4,108,241 | A | * | 8/1978 | Fortini et al. ................ 165/146 |
| 5,899,060 | A |   | 5/1999 | Schmidt ....................... 60/267 |

FOREIGN PATENT DOCUMENTS

| DE | 199 01 422 | 7/2000 |
| WO | WO 00/42310 | 7/2000 |

* cited by examiner

Primary Examiner—Ehud Gartenberg
(74) Attorney, Agent, or Firm—Crowell & Moring LLP

(57) ABSTRACT

A rocket propulsion unit with an outer casing and an inner casing is described whereby the inner casing is arranged with space between the outer casing, and the inner casing forms a combustion chamber and has a contour adapted to the expulsion of propellants out of the combustion chamber with a constriction for forming a combustion chamber neck. The outer casing in contrast has a contour deviating from the contour of the inner casing.

24 Claims, 1 Drawing Sheet

ROCKET PROPULSION UNIT WITH SEPARATION OF INNER AND OUTER CASING AND METHOD OF MAKING SAME

This application claims the priority of German Application No. 101 26 923.4 filed Jun. 1, 2001, the disclosure of which is expressly incorporated by reference herein.

BACKGROUND AND SUMMARY OF THE INVENTION

The present invention concerns a rocket propulsion unit with an outer casing and an inner casing whereby the inner casing, also called the liner, is arranged with a space between the outer casing and inner casing. The inner casing forms a combustion chamber and a contour adapted to the expulsion of propellants out of the combustion chamber with a constriction to form a combustion chamber neck.

Rocket propulsion units, which have a structure on the basis of an outer casing and an inner casing have been known for a long time as being the state of the art. Hereto, reference is made to DE 199 01 422 as an example. With such rocket propulsion units, the inner casing, which can contain a cooling structure, and the outer casing are connected firmly with each other. The outer casing can be, for example, galvanized to the inner casing.

U.S. Pat. No. 5,899,060, in contrast, shows a rocket propulsion unit in which the inner casing and the outer casing are arranged with a spacing of a constant distance between each other and have the same contour, whereby in the operating condition of the rocket propulsion unit, the inner casing is pressed to the outer casing, so that the outer casing supports the inner casing.

A disadvantage with the aforementioned state of the art technology is, however, that the inner casing and outer casing must use a costly adaptation to each other and thus an optimization of the entire structure must constantly take place with possible required changes in the combustion chamber region. Expensive connections between the inner casing and outer casing as well as galvanic connections or welded joints are also necessary. If a part of the structure is damaged by an operation, then as a rule the entire propulsion unit cannot be reused.

An object of the present invention is to provide a rocket propulsion unit, which requires the simplest production possible, especially, a low expense for optimization of the individual components. This object is achieved according to certain preferred embodiments of the invention by providing a rocket propulsion unit with an outer casing and an inner casing, whereby the inner casing is arranged with a space between the outer casing and inner casing, and the inner casing forms a combustion chamber, and has a contour adapted for expulsion of propellants from the combustion chamber with a constriction to form a combustion chamber neck, wherein the outer casing has a contour deviating from the contour of the inner casing.

According to the invention, the rocket propulsion unit has an outer casing and an inner casing, whereby the inner casing is arranged with a space between the outer casing and inner casing. The inner casing forms a combustion chamber and has a contour adapted to the expulsion of propulsion liquids from the combustion chamber with a constriction forming a combustion neck. In accordance with this invention, it is now provided that the outer casing is not adapted to this contour of the inner casing, but has a contour deviating from the contour of the inner casing. The local distances between the inner casing and outer casing are, therefore, as a rule, not constant but vary according to the different contours of the inner casing and outer casing. This is, however, not a problem, since it is not provided for the inner casing to be close to the outer casing (for example, by pressing on in the operating state). The inner casing merely has to have a sufficient strength in order to be able to match the stresses arising in the combustion chamber during the operation. Thus the results are a broad based functional separation of inner stress-bearing structure and outer stress-bearing structure of the rocket propulsion unit.

In this way, the outer casing can be configured independently from the possible optimization-required contour of the inner casing. For example, a standard structure can be established for the outer casing that can be maintained largely constant during the entire development phase of a propulsion unit or even for an entire propulsion family unit. Thus the development of production of rocket propulsion units is basically simplified and configured more cost efficiently. The inner casing and outer casing can also be optimized largely without reciprocal affects with regard to their structure, material, durability and rigidity or elasticity.

A further cost optimization can be achieved by designing the inner casing to be interchangeable according to certain preferred embodiments of the invention. The inner casing is exposed to high operating temperatures, which restricts the economic life of the inner casing. With previous rocket propulsion systems, the economic life of the entire propulsion unit is thus automatically limited. If, however, the inner casing is designed interchangeably, which in particular can be realized through corresponding detachable connections between the inner casing and outer casing, then the remaining structure of the propulsion unit can be reused, which considerably reduces the cost and also the time needed for recovery of the propulsion unit.

Specifically, it can be provided according to certain preferred embodiments of the invention that the inner casing and the outer casing are joined with one another only in the regions of the ends of the inner casing. Therewith, the greatest possible freedom in configuring the inner casing and the outer casing can be achieved and, on the other hand, the necessary connections between the inner and outer casing are reduced to a minimum.

To compensate for thermal expansion between inner casing and outer casing, it can be provided according to certain preferred embodiments of the invention that the inner casing is firmly connected in the region of a first end (in the event of an interchangeable inner casing immobile, but detachable) with the outer casing, and is mounted longitudinally movable in a region of a second end in a bearing.

As already mentioned, the invention allows selection of a standard structure for the outer casing which is independent from the special contouring of the combustion chamber. In this case, the standard structure can largely be selected as a geometrically very simple form. Thus it can be provided specifically that the outer casing has a basically tube-like contour according to certain preferred embodiments of the invention. Thus, the outer casing forms a housing, enclosing the inner casing, in which the inner casing is arranged. "Basically tube-like" means that in certain sub-regions, especially where inner casing and outer casing are joined together, the contour of the outer casing can be approximated to the contour of the inner casing. Thus, especially the outer casing can spread out in the area of the open end of the combustion chamber. In this area, downstream from the combustion chamber neck, the combustion chamber as well as the inner casing widen. Thus, a connection of outer casing and inner casing can be facilitated in this region.

In order to withstand the high temperatures in the combustion chamber, the inner casing can contain a cooling system according to certain preferred embodiments of the invention. But it can also be provided that the inner casing is made of a correspondingly high temperature-resistant material, especially of ceramic.

Other objects, advantages and novel features of the present invention will become apparent from the following detailed description of the invention when considered in conjunction with the accompanying drawings.

BRIEF DESCRIPTION OF THE DRAWINGS

The single drawing

DETAILED DESCRIPTION OF THE DRAWINGS

Figure 1:
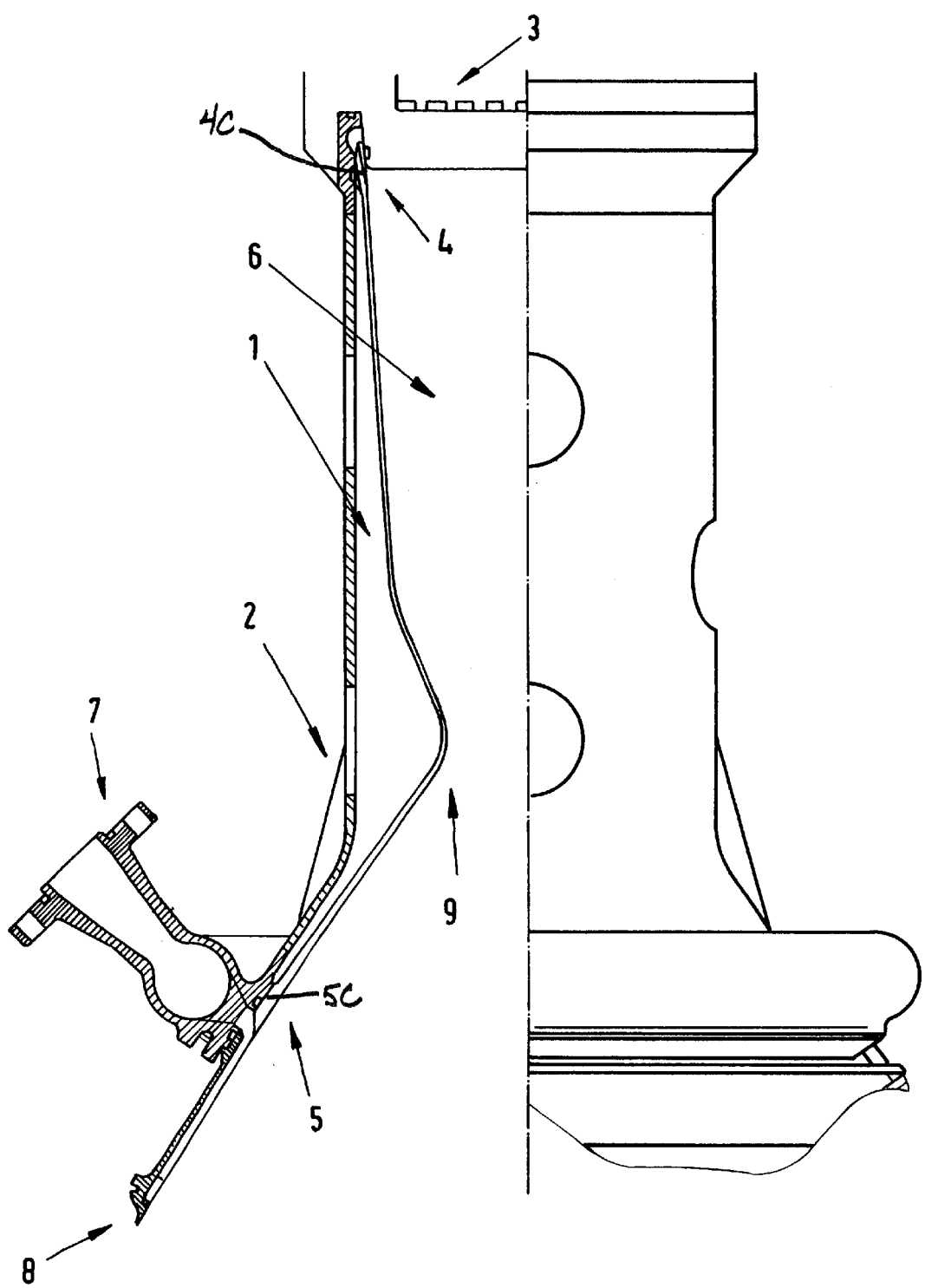
FIG. 1 shows a schematic cross section of a rocket propulsion system constructed according to certain preferred embodiments of the invention.

The rocket propulsion unit represented in FIG. 1 has a combustion chamber 6, which is bounded on one end by an injection head 3. The other end of the combustion chamber 6 opens to the combustion chamber neck 9 and downstream of the combustion chamber 6 is the expansion nozzle 8. The contour of the combustion chamber 6 results from the contour of the inner casing 1, which contains a not very explicitly represented cooling system with the cooling channels as they are basically known from the state of the art technology. The coolant for the cooling system of the inner casing is introduced through a supply 7. The inner casing 1, moreover, bears the arising inner stresses of the propulsion unit. Furthermore, an outer casing 2 is provided, which intercepts the outer stresses acting on the propulsion unit.

As FIG. 1 clearly shows, the inner casing 1 is practically completely separated from the outer casing 2 and, in addition, it also has another contour. The contour of the inner casing 1 is adapted to the special requirements of the combustion chamber 6. Through this contour, an optimal expulsion flow of propellants is obtained and burned after being injected through the injection head 3 into the combustion chamber 6. A constriction of the contour is in particular provided to develop a combustion chamber neck 9 that ensures sufficient pressure conditions in the combustion chamber. In contrast, the outer casing 2 has a geometrically very simple contour, which corresponds to a tube-like contour over a broad area. Thus, the outer casing 2 corresponds to a type of standard housing which does not require specific adaptations to the special requirement of combustion chamber 6. Only in a lower area past the combustion chamber neck 9, that is in an area, which is adjacent to the lower end 5 of the inner casing 1, does the contour of the outer casing 2 widen. This serves to approximate the contours of inner casing 1 and outer casing 2 to each other in this area 5 in order to provide a fixed but detachable connection 5C between inner casing 1 and outer casing 2 in this region. A further connection 4C between inner casing 1 and outer casing 2 is provided in the region of the other end 4 of the inner casing, whereby this connection 4C is realized through a longitudinally movable mounting of the inner casing 1 in a corresponding bearing arranged on the outer casing 2 or between the outer casing 2 and the injector head. In this way, thermal expansion arising between inner casing 1 and outer casing 2 can be equalized.

Inner casing 1 and outer casing 2 are thus functionally separated and clearly spaced from each other over a broad range of the longitudinal extensions of the inner casing and the outer casing. There only exists a connection between inner casing 1 and outer casing 2 at the end regions 4 (connection 4C) and 5 (connection 5C) of the inner casing. In this way, both can be optimized largely separated from each other. Since the inner casing 2, moreover, is connected through detachable connections 4C, 5C with the outer casing 1, and the contour of the outer casing 2 has no constriction, the inner casing 1 can be exchanged in the event of wear and tear, whereas the remaining components of the propulsion unit less subject to wear and tear remain reusable. A propulsion unit, which is unusable primarily due to wear and tear of the inner casing 1, can be ready for reuse in operation by a simple exchange of the inner casing 1. In this way, the economic life of the propulsion unit is extended in a simple and economic manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Rocket propulsion unit with an outer casing and an inner casing, whereby the inner casing is arranged with a space between the outer casing and inner casing, and the inner casing forms a combustion chamber, and has a contour adapted for expulsion of propellants from the combustion chamber with a constriction to form a combustion chamber neck, wherein the outer casing has a contour deviating from the contour of the inner casing, wherein said outer casing includes a tubular substantially cylindrical section and expanding conical section at an end of the outer casing adjacent a propellant exhaust opening, and wherein said inner casing extends with a continuously increasing spacing from the outer casing in a downstream direction from an injector region up to said constriction forming the combustion chamber neck.

2. Rocket propulsion unit according to claim 1, wherein the inner casing is designed to be interchangeable.

3. Rocket propulsion unit according to claim 1, wherein the inner casing and the outer casing are connected with each other only in areas of ends of the inner casing.

4. Rocket propulsion unit according to claim 2, wherein the inner casing and the outer casing are connected with each other only in areas of ends of the inner casing.

5. Rocket propulsion unit according to claim 3, wherein the inner casing is firmly connected with the outer casing in a region of a first end and is mounted longitudinally mobile in a bearing in a region of a second end.

6. Rocket propulsion unit according to claim 4, wherein the inner casing is firmly connected with the outer casing in a region of a first end and is mounted longitudinally mobile in a bearing in a region of a second end.

7. Rocket propulsion unit according to claim 1, wherein the outer casing has a basically tube-like contour.

8. Rocket propulsion unit according to claim 2, wherein the outer casing has a basically tube-like contour.

9. Rocket propulsion unit according to claim 3, wherein the outer casing has a basically tube-like contour.

10. Rocket propulsion unit according to claim 7, wherein the outer casing widens in a region of an open end of the combustion chamber.

11. Rocket propulsion unit according to claim 1, wherein the inner casing contains a cooling system.

12. Rocket propulsion unit according to claim 2, wherein the inner casing contains a cooling system.

13. Rocket propulsion unit according to claim 3, wherein the inner casing contains a cooling system.

14. Rocket propulsion unit according to claim 5, wherein the inner casing contains a cooling system.

15. Rocket propulsion unit according to claim 7, wherein the inner casing contains a cooling system.

16. Rocket propulsion unit according to claim 10, wherein the inner casing contains a cooling system.

17. Rocket propulsion unit according to claim 1, wherein the inner casing is made of a high temperature-resistant material, especially of ceramic.

18. Rocket propulsion unit according to claim 1, wherein said outer casing has a substantially cylindrical contour along a substantial portion of its length which extends upstream and downstream of the constriction on the inner casing.

19. A method of making a rocket propulsion unit comprising:

forming an outer casing with an internal surface contour, forming an inner casing with an external surface contour which is different than the internal surface contour of the outer casings, said inner casing forming a rocket combustion chamber having a constriction forming a combustion chamber neck, and attaching the inner casing to the outer casing with a varying spacing along a length of the casings between the internal surface contour of the outer casing and the external surface contour of the inner casing, wherein said outer casing includes a tubular substantially cylindrical section and expanding conical section at an end of the outer casing adjacent a propellant exhaust opening, and wherein said inner casing extends with a continuously increasing spacing from the outer casing in a downstream direction from an injector region up to said constriction forming the combustion chamber neck.

20. A method according to claim 19, wherein said attaching includes detachably attaching the inner casing to the outer casing at longitudinally spaced connection locations.

21. A method according to claim 20, comprising changing combustion chamber configuration by exchanging one inner casing for another inner casing with a different contour.

22. A method according to claim 19, wherein said attaching includes axially fixing the inner casing to the outer casing at a first connection location and axially slidably connecting the inner casing to the outer casing at a second connection location spaced longitudinally from the first connection location.

23. A method according to claim 20, wherein said attaching includes axially fixing the inner casing to the outer casing at a first connection location and axially slidably connecting the inner casing to the outer casing at a second connection location spaced longitudinally from the first connection location.

24. A method according to claim 21, wherein said attaching includes axially fixing the inner casing to the outer casing at a first connection location and axially slidably connecting the inner casing to the outer casing at a second connection location spaced longitudinally from the first connection location.

* * * * *